(12) United States Patent
Viault et al.

(10) Patent No.: US 10,190,444 B2
(45) Date of Patent: Jan. 29, 2019

(54) CAM FOLLOWER ROLLER DEVICE WITH WASHER

(71) Applicants: Samuel Viault, Saint-Antoine-du-Rocher (FR); Benoit Hauvespre, Saint Etienne de Chigny (FR); Thomas Perrotin, Saint Roch (FR)

(72) Inventors: Samuel Viault, Saint-Antoine-du-Rocher (FR); Benoit Hauvespre, Saint Etienne de Chigny (FR); Thomas Perrotin, Saint Roch (FR)

(73) Assignee: Aktiebolaget SKF, Göteborg (SE)

(*) Notice: Subject to any disclaimer, the term of this patent is extended or adjusted under 35 U.S.C. 154(b) by 114 days.

(21) Appl. No.: 15/346,177

(22) Filed: Nov. 8, 2016

(65) Prior Publication Data

US 2017/0145868 A1  May 25, 2017

(30) Foreign Application Priority Data

Nov. 24, 2015  (EP) .................................... 15306855

(51) Int. Cl.
| | |
|---|---|
| *F01L 1/14* | (2006.01) |
| *F16H 53/06* | (2006.01) |
| *F02M 59/10* | (2006.01) |
| *F02M 59/44* | (2006.01) |
| *F01L 1/46* | (2006.01) |

(52) U.S. Cl.
CPC .............. *F01L 1/14* (2013.01); *F02M 59/102* (2013.01); *F02M 59/44* (2013.01); *F16H 53/06* (2013.01); *F01L 1/46* (2013.01); *F01L 2103/00* (2013.01); *F01L 2105/00* (2013.01); *F01L 2105/02* (2013.01); *F01L 2107/00* (2013.01)

(58) Field of Classification Search
CPC . F01L 1/14; F01L 1/46; F01L 2105/00; F01L 2105/02; F01L 2107/00; F16H 53/06
USPC ............................................ 123/90.48, 90.5
See application file for complete search history.

(56) References Cited

U.S. PATENT DOCUMENTS

| | | | | |
|---|---|---|---|---|
| 5,307,769 A | * | 5/1994 | Meagher ................... | F01L 1/14 123/90.5 |
| 2008/0190237 A1 | * | 8/2008 | Radinger ................ | F01L 1/143 74/569 |

(Continued)

FOREIGN PATENT DOCUMENTS

| | | |
|---|---|---|
| DE | 102008001018 A1 | 10/2009 |
| DE | 102012210176 A1 | 12/2013 |

(Continued)

*Primary Examiner* — Jorge Leon, Jr.
(74) *Attorney, Agent, or Firm* — Bryan Peckjian; SKF USA Inc. Patent Dept.

(57) ABSTRACT

The cam follower roller device providing a tappet body extending along an axis, an insert mounted in the tappet body, a pin mounted at least on the insert and a roller mounted on the pin. The device further provides a retaining washer mounted into a bore of the tappet body so as to axially retain the insert inside the tappet body. The tappet body provides retention means, cooperating with the washer to axially retain the washer relative to the tappet body. The retaining washer is axially interposed between the insert and the retention means.

12 Claims, 2 Drawing Sheets

(56) References Cited

U.S. PATENT DOCUMENTS

| | | | |
|---|---|---|---|
| 2010/0012065 A1* | 1/2010 | Dorn | F01L 1/143 |
| | | | 123/90.48 |
| 2012/0125277 A1* | 5/2012 | Chambonneau | F04B 1/0417 |
| | | | 123/90.48 |
| 2014/0150602 A1* | 6/2014 | Hauvespre | F01L 1/14 |
| | | | 74/569 |
| 2015/0152826 A1* | 6/2015 | Dorn | F02M 59/102 |
| | | | 74/569 |
| 2016/0230868 A1* | 8/2016 | Champalou | F01L 1/14 |

FOREIGN PATENT DOCUMENTS

| | | |
|---|---|---|
| DE | 102012211113 A1 | 1/2014 |
| DE | 102013201335 A1 | 7/2014 |
| EP | 2853738 A1 | 4/2015 |

\* cited by examiner

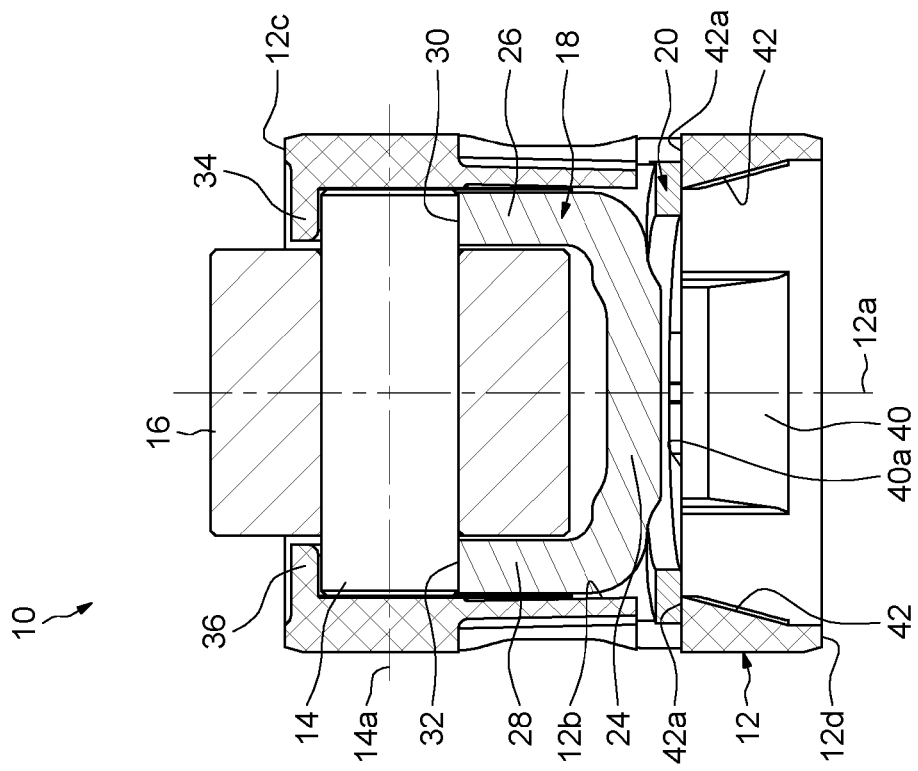
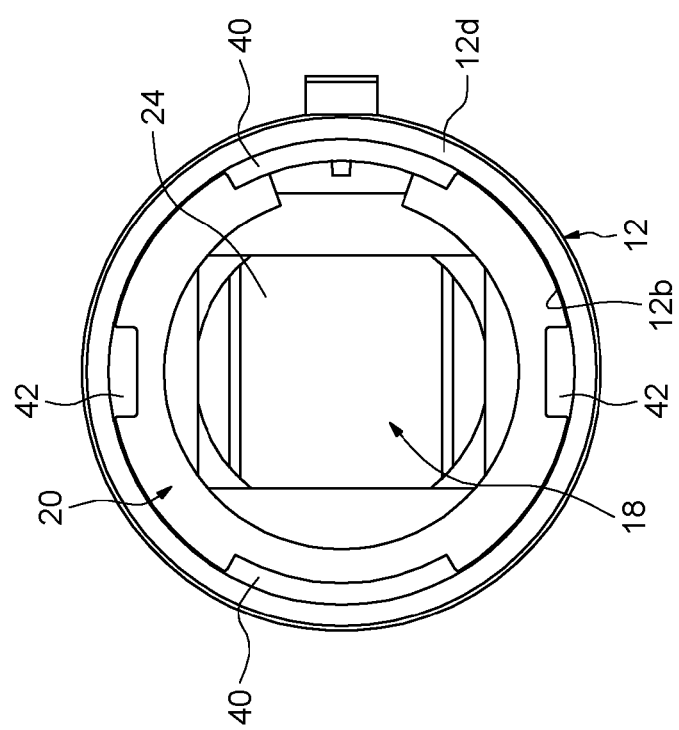

CAM FOLLOWER ROLLER DEVICE WITH WASHER

CROSS REFERENCE TO RELATED APPLICATIONS

This application claims priority to European patent application no. 15306855.6 filed on Nov. 24, 2015, the contents of which are fully incorporated herein by reference.

FIELD OF THE INVENTION

The present invention relates to the field of cam follower roller devices used in automotive or industrial applications. One advantageous application of the invention is the use of the cam follower roller device in a fuel injection pump intended for an internal combustion engine, in particular of a motor vehicle. Another advantageous application of the invention is the use of the device in a rocker system intended for controlling valves of an internal combustion piston engine.

BACKGROUND OF THE INVENTION

Such a cam follower roller device generally provides an outer tappet body, a pin mounted on the tappet body and a roller movable in rotation relative to the pin around its axis. When the cam follower roller device is in service in a fuel injection pump, the roller collaborates with a cam synchronized with the internal combustion engine camshaft or crankshaft. The rotation of the camshaft, or crankshaft, leads to a periodic displacement of a piston of the pump that rests against the tappet body, to allow fuel to be delivered.

It is also known to provide the cam follower roller device with an insert as a stroke-transmission part mounted in the tappet body. EP-A1-2 853 738 describes a device comprising such an insert supporting the pin.

In order that the sub-assembly formed by the pin, the roller and the insert be held in place during storage and transport of the device, first and second local deformations are formed on the tappet body for fixing the insert to the body. The first and second deformations are respectively made by punching the tappet housing along a radial direction, and then along an axial direction.

BRIEF SUMMARY OF THE INVENTION

One aim of the present invention is to provide an improved cam follower roller device having a simplified assembly.

In one embodiment, the cam follower roller device provides a tappet body extending along an axis, an insert mounted in the tappet body, a pin mounted at least on the insert and a roller mounted on the pin. The device further provides a retaining washer mounted into a bore of the tappet body so as to axially retain the insert inside the tappet body. The tappet body provides retention means cooperating with the washer to axially retain the washer relative to the tappet body. The retaining washer is axially interposed between the insert and the retention means of the tappet body.

The cam follower roller device constitutes a unitary assembly that can be stored, handled, transported and delivered as a pre-assembled unit to a motor vehicle manufacturer. The retaining washer is a separate and distinct part from the tappet body and the insert. The sub-assembly formed by the pin, the roller and the insert is held in place into the tappet body by the washer while the retention means of the tappet body axially retain the washer. The cam follower roller device has a simple design.

The retaining washer may be in axial contact with the insert on one side and in axial contact with the retention means of the tappet body on the other side.

Preferably, the washer is a pre-stressing washer exerting an axial force on the insert. In this case, the washer may be a wavy washer. Alternatively, the washer may be a flat washer.

Preferably, the washer is elastically deformable at least in the radial direction. In order to facilitate its radial deformation, the washer may be open in the circumferential direction.

The washer may be disposed axially on the side opposite to the pin and the roller with respect to the insert. In one embodiment, the washer is entirely housed inside the tappet body.

In one embodiment, the retention means of the tappet provide at least one protrusion radially protruding inwards with respect to the bore of the body and delimiting an abutment surface for the retaining washer, the abutment surface being oriented axially on the side of the insert.

The tappet body and the retention means may be made in one part. Alternatively, the retention means may be a separate and distinct part from the tappet body which may be secured to the body by any appropriate means.

In one embodiment, the insert provides a central core and at least two side tabs, the pin being mounted at least on the tabs. The retaining washer may be mounted in axial contact with the core of the insert. Preferably, each tab of the insert provides a receiving housing into which is mounted an end of the pin. The tappet body may provide axial blocking means for maintaining the pin into the receiving housings.

In one embodiment, the tappet body further provides anti-rotation means provided on the bore of the body and cooperating with the tabs of the insert to prevent the insert from moving in the circumferential direction. The anti-rotation means may provide two pairs of two axial ribs, each tab of the insert being located circumferentially between the two ribs of one pair.

In one embodiment, the device may further provide a spacer mounted axially against the core of the insert on the side opposite to the pin and the roller.

BRIEF DESCRIPTION OF THE SEVERAL VIEWS OF THE DRAWING

The present invention and its advantages will be better understood by studying the detailed description of specific embodiments given by way of non-limiting examples and illustrated by the appended drawings on which:

FIG. 3 is a bottom view of the device of FIG. 1, and FIG. 4 is a cross-section of a cam follower roller device according to a second example of the invention.

DETAILED DESCRIPTION OF THE INVENTION

Figure 1:
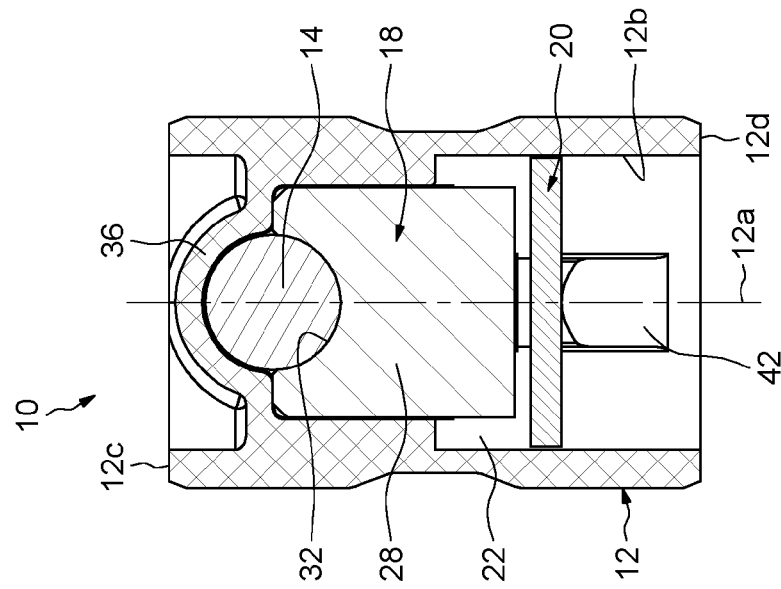
FIG. 1 is a cross-section of a cam follower roller device according to a first example of the invention.
Figure 2:
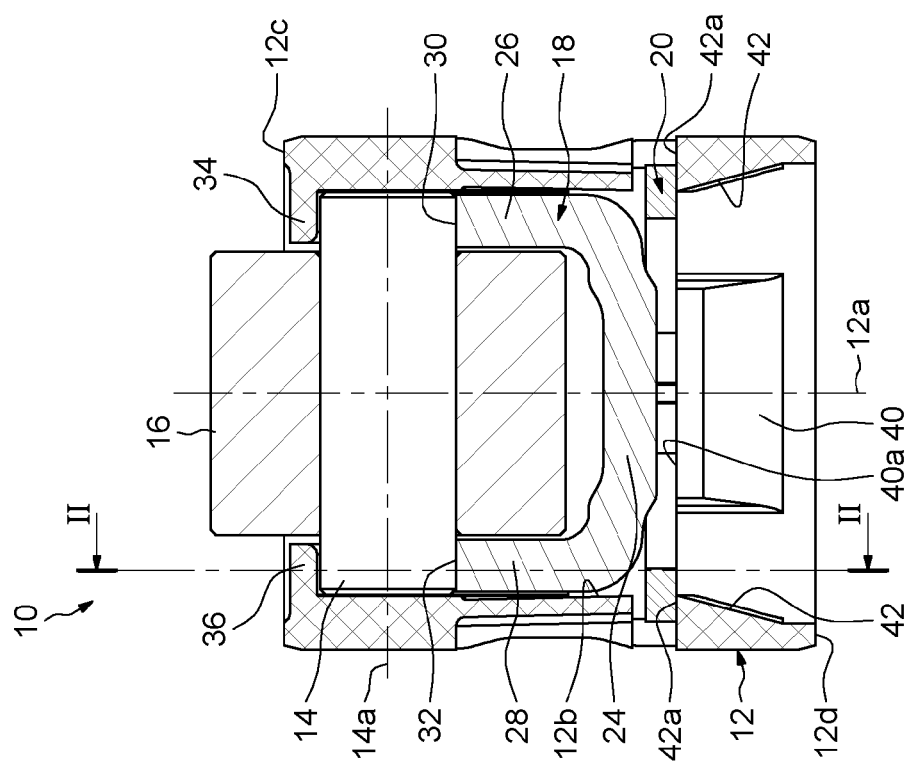
FIG. 2 is a section on II-II of FIG. 1.

As shown on FIGS. 1 and 2, a cam follower roller device 10 provides an outer tappet housing or body 12 extending along an axis 12a, a shaft or pin 14 extending along an axis 14a perpendicular to the axis 12a, a roller 16 mounted on the pin and movable in rotation relative to the pin, and a stroke-transmission part or insert 18 mounted in the tappet body.

As will be described later, the device 10 further provides a retaining washer 20 to axially retain the insert 18 in the tappet body 12. The insert 18 supports the pin 14 while the washer 20 supports the insert.

In the disclosed embodiment, the roller 16 is directly mounted on the pin 14. Alternatively, a rolling bearing or a plain bearing may be radially interposed. The roller 16 provides a cylindrical outer surface (not referenced) which forms a contact surface intended to bear against the associated cam of the internal combustion engine.

The tappet body 12 is made in one part. In the disclosed example, the body 12 has a tubular form. The tappet body 12 provides a cylindrical axial outer surface and a cylindrical axial inner surface or bore 12b. The bore 12b delimits a cavity 22 inside which are located the insert 18 and the pin 14. The roller 16 axially protrudes outwards with respect to an upper face 12c of the tappet body 12. The tappet body 12 also provides a lower face 12d which delimits axially together with the upper face 12c the body. In the illustrated example, the tappet body 12 is made from synthetic material, such as polyamide for example. The tappet body 12 is advantageously formed by molding. Alternatively, the tappet body 12 may be made of metal, for example in an economic way by cutting, stamping and folding.

The insert 18 is made in one part. The insert 18 may preferably be made of metal, by example steel, or be made of plastic material. The insert 18 is distinct from the tappet body 12. In the disclosed example, the insert 18 is entirely housed inside the cavity 22 delimited by the tappet body 12.

The insert 18 provides a base part or central core 24 and two side parts or lateral tabs 26, 28 extending from the core and facing each other. The tabs 26, 28 of the insert extend from the core 24 towards the upper face 12c of the tappet body. The insert 18 has in cross-section a U-shape. The roller 16 is disposed between the tabs 26, 28. A concave recess 30, 32 is provided at the free end of each tab to receive the pin 14. Both recesses 30, 32 extend through the tabs 26, 28 along the axis 14a and have the same diameter. Recesses 30, 32 form receiving housings adapted to receive the ends of the pin 14. Each end of the pin 14 is supported by one of the two tabs 26, 28. The pin 14 is supported by the insert 18.

The tappet body 12 further provides means 34, 36 for axially blocking the pin 14 and the roller 16 relative to the body. The axial blocking means 34, 36 block the translation of the pin 14 in a direction from the lower face 12d of the tappet body towards the upper face 12c. The axial blocking means 34, 36 are integrally formed with the tappet body 12. In the illustrated example, these means 34, 36 are provided on the bore 12b of the tappet body at the upper face 12c. The axial blocking means 34, 36 delimit receiving housings each facing one of the receiving housings 30, 32 of the insert to delimit together cylindrical bores for the ends of the pin 14. Alternatively, it could be possible to provide a spacer comprising cylindrical through-holes made into the thickness of the lateral tabs and facing one another, the ends of the pin 14 being fixed in the through-holes.

The tappet body 12 also provides two pairs of two axial ribs (not shown) provided on the inner surface of the body and which radially protrude inwards. The ribs of each pair extend axially one the axial blocking means 34, 36. The ribs of each pair are spaced apart one relative to another to delimit a space into which is located one of the tabs 26, 28 of the insert. Accordingly, each tab 26, 28 is located circumferentially between the two ribs of one pair. The ribs cooperate with the tabs 26, 28 to prevent the insert 18 from moving in the circumferential direction relative to the tappet body 12.

The retaining washer 20 is distinct from the insert 18 and the tappet body 12. The washer 20 is mounted into the bore 12b of the tappet body. The washer 20 is centered into the bore 12b. The washer 20 is coaxial with the axis 12a of the tappet body. The washer 20 is entirely housed inside the cavity 22 delimited by the tappet body 12. The washer 20 is elastically deformable in the radial direction. The washer 20 is open in the circumferential direction. The washer 20 may be a circlip.

The washer 20 retains the unit or sub-assembly formed by the insert 18, the pin 14 and the roller 16 in the tappet body 12. The sub-assembly is axially held in place by the washer 20. The washer 20 axially abuts against the insert 18 axially on the side opposite to the roller 14 and the pin 16. The washer 20 is mounted in axial contact with the core 24 of the insert. The insert 18 is supported by the tappet body 12 with the aid of the washer 20.

A plurality of protrusions 40, 42 are formed on the bore 12b of the tappet body. The protrusions 40, 42 protrude radially inwards with respect to the bore 12b. The protrusions 40, 42 form hooks directed radially inwards. In the disclosed example, the protrusions 40, 42 are located near to the lower face 12d of the tappet body. The protrusions 40, 42 are regularly spaced apart in the circumferential direction. The protrusions 40, 42 are integrally formed with the tappet body 12.

As shown more clearly on FIG. 3, in the disclosed example, the tappet body 12 provides one pair of two protrusions 40, respectively 42, facing one another. The protrusions 40, 42 of one pair are identical one another. Here, the protrusions 42 have a circumferential length smaller than the one of the protrusions 40. In another variant, the number and/or the length of the protrusions of the tappet body may be adapted. In one embodiment, it could also be possible to foresee only one annular protrusion on the bore 12b of the tappet body, for example when the body is made of metal.

Referring once again to FIG. 1, the washer 20 is axially interposed between the insert 18 and the protrusions 40, 42 of the tappet body. The washer 20 is axially disposed above the protrusions 40, 42. Each protrusion 40, 42 delimits an abutment surface 40a, 42a oriented axially on the side of the insert 18. Each abutment surface 40a, 42a is oriented axially towards the upper face 12c of the tappet body. Each abutment surface 40a, 42a extends radially.

The washer 20 comes into axial contact with the abutment surfaces 40a, 42a of the protrusions. The washer 20 is in axial contact against the insert 18 on one side and in axial contact with the protrusions 40, 42 of the tappet body on the other side. The protrusions 40, 42 axially block the washer 20 in the tappet body 12. The inner diameter of the bore delimited by the protrusions 40, 42 is smaller than the outer diameter of the washer.

The protrusions 40, 42 of the tappet body form retention means cooperating by axial contact with the washer 20 to prevent any axial movement of the washer downward. An axial movement of the washer 20 in a direction from the upper face 12c of the tappet body towards the lower face 12d is prevented.

In this example, the washer 20 is a flat washer. Alternatively, an axially elastic washer 20, for instance a wavy washer, may be provided as illustrated in the second example illustrated on FIG. 4 in which identical parts are given identical references. Such washer exerts a permanent axial force, or preload, on the insert 18. The axial pre-stress exerted by the washer 20 is transmitted from the insert 18 to the pin 14, and thus maintains the axial contact between the pin and the axial blocking means 34, 36 of the tappet body.

In the disclosed examples, the retaining washer 20 has in cross-section a rectangular shape. Alternatively, the washer may have any other different profile, for example a circular one. In the disclosed examples, the washer 20 is open in the circumferential direction to facilitate its mounting into the tappet body. Alternatively, the washer may have an annular form. In the disclosed examples, the washer 20 is made of metal. In another embodiment, the washer may be made from elastic material, for example an elastomer such as nitrile rubber or polyurethane.

In the disclosed examples, the tappet body 12 provides protrusions 40, 42 protruding inwards to axially retain the washer. Alternatively, the tappet body 12 may provide other retention means. For example, it could be possible to foresee a tappet body comprising an annular groove formed on the bore 12*b* and into which is inserted partly the washer. In this case, the groove prevents an axial movement of the washer 20 in two directions, and not only in one direction as it is the case with the protrusions 40, 42 as disclosed in the illustrated examples.

The invention claimed is:

1. A cam follower roller device comprising:
    a tappet body extending along an axis,
    an insert mounted in the tappet body,
    a pin mounted at least on the insert, and
    a roller mounted on the pin, and
    a retaining washer mounted into a bore of the tappet body to axially retain the insert inside the tappet body, the tappet body having retention means configured to cooperate with the retaining washer to axially retain the retaining washer relative to the tappet body, the retaining washer axially interposed between the insert and the retention means,
    wherein the retaining washer is a pre-stressing washer adapted to exert an axial force on the insert, and
    wherein the retaining washer is a wavy washer.

2. The device according to claim 1, wherein the retaining washer is in axial contact with the insert on an upper side of the retaining washer and in axial contact with the retention means of the tappet body on a lower side of the retaining washer.

3. The device according to claim 1, wherein the retaining washer is elastically deformable at least in a radial direction.

4. The device according to claim 1, wherein the retaining washer is open in a circumferential direction.

5. The device according to claim 1, wherein the retaining washer is disposed axially on a side opposite to the pin and the roller with respect to the insert.

6. The device according to claim 1, wherein the retaining washer is entirely housed inside the tappet body.

7. The device according to claim 1, wherein the retention means of the tappet body provides at least one protrusion radially protruding inwards with respect to the bore of the tappet body and delimiting an abutment surface for the retaining washer, the abutment surface being oriented axially on a side of the insert.

8. The device according to claim 1, wherein the tappet body and the retention means are made in one part.

9. A cam follower roller device comprising:
    a tappet body extending along an axis,
    an insert mounted in the tappet body,
    a pin mounted at least on the insert, and
    a roller mounted on the pin, and
    a retaining washer mounted into a bore of the tappet body to axially retain the insert inside the tappet body, the tappet body having retention means configured to cooperate with the retaining washer to axially retain the retaining washer relative to the tappet body, the retaining washer axially interposed between the insert and the retention means,
    wherein the insert further comprises a central core and at least two side tabs, the pin being mounted on the at least two side tabs,
    wherein the retaining washer is mounted in axial contact with the central core of the insert.

10. The device according to claim 9, wherein each of the at least two side tabs of the insert comprises a receiving housing into which an end of the pin is mounted.

11. The device according to claim 9, wherein the tappet body further comprises axial blocking means configured for maintaining the pin in the receiving housings.

12. The device according to claim 9, wherein the retaining washer is a flat washer.

* * * * *